(12) United States Patent
Ho et al.

(10) Patent No.: US 12,162,607 B2
(45) Date of Patent: Dec. 10, 2024

(54) ENVIRONMENTAL CONTROL SYSTEM FOR SUPERSONIC COMMERCIAL AIRCRAFT

(71) Applicant: Hamilton Sundstrand Corporation, Charlotte, NC (US)

(72) Inventors: Tony Ho, Glastonbury, CT (US); Matthew Pess, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 5 days.

(21) Appl. No.: 17/176,655

(22) Filed: Feb. 16, 2021

(65) Prior Publication Data
US 2022/0144438 A1 May 12, 2022

Related U.S. Application Data

(60) Provisional application No. 63/112,923, filed on Nov. 12, 2020.

(51) Int. Cl.
*B64D 13/08* (2006.01)
*B64C 30/00* (2006.01)
*B64D 13/06* (2006.01)

(52) U.S. Cl.
CPC ............ *B64D 13/08* (2013.01); *B64C 30/00* (2013.01); *B64D 2013/0618* (2013.01); *B64D 2013/0648* (2013.01); *B64D 2013/0659* (2013.01)

(58) Field of Classification Search
CPC ............ B64D 13/08; B64D 2013/0618; B64D 2013/0648; B64D 2013/0659; B64D 13/06; B64C 30/00; Y02T 50/50

USPC ............................................................. 62/87
See application file for complete search history.

(56) References Cited

U.S. PATENT DOCUMENTS

| 2,767,561 A | 10/1956 | Seeger |
| 2,777,301 A * | 1/1957 | Kuhn ................ B64D 13/06 417/381 |
| 3,177,679 A | 4/1965 | Quick et al. |
| 4,263,786 A * | 4/1981 | Eng ................... B64D 13/06 62/89 |

(Continued)

FOREIGN PATENT DOCUMENTS

| DE | 3807372 A1 * | 9/1989 |
| EP | 1190946 A2 | 3/2002 |

(Continued)

OTHER PUBLICATIONS

JP2004142501 A (Year: 2004).*

(Continued)

*Primary Examiner* — Len Tran
*Assistant Examiner* — Kirstin U Oswald
(74) *Attorney, Agent, or Firm* — CANTOR COLBURN LLP

(57) ABSTRACT

An environmental control system includes a cooling circuit having at least one heat exchanger for cooling a first medium therein. At least one compressing device is operably coupled to the cooling circuit. The at least one compressing device includes a first compressor and a second compressor, wherein the first medium is provided to the first compressor and the second compressor in series, and a temperature of the first medium provided to an inlet of the second compressor is less than the temperature of the first medium at an outlet of the first compressor.

15 Claims, 8 Drawing Sheets

(56) References Cited

U.S. PATENT DOCUMENTS

| | | | | |
|---|---|---|---|---|
| 4,550,561 | A * | 11/1985 | Coffinberry | F02C 7/14 60/785 |
| 5,086,622 | A * | 2/1992 | Warner | B64D 13/06 62/88 |
| 5,860,283 | A * | 1/1999 | Coleman | B64D 13/06 62/402 |
| 5,918,472 | A * | 7/1999 | Jonqueres | B64D 13/06 62/402 |
| 6,128,909 | A | 10/2000 | Jonqueres | |
| 6,199,387 | B1 * | 3/2001 | Sauterleute | B64D 13/06 62/87 |
| 6,260,348 | B1 * | 7/2001 | Sugishita | C01B 3/32 60/39.12 |
| 6,442,941 | B1 * | 9/2002 | Anand | F02C 7/32 60/39.182 |
| 6,672,062 | B2 * | 1/2004 | Shaffer | F02B 29/0437 60/39.183 |
| 9,669,936 | B1 | 6/2017 | Fiterman et al. | |
| 10,160,547 | B2 | 12/2018 | Bruno et al. | |
| 2003/0126880 | A1 * | 7/2003 | Zywiak | B64D 13/06 62/402 |
| 2003/0177781 | A1 * | 9/2003 | Haas | B64D 13/06 62/402 |
| 2004/0131138 | A1 * | 7/2004 | Correia | G21D 5/06 376/381 |
| 2005/0252193 | A1 * | 11/2005 | Iya | F02K 1/822 60/266 |
| 2006/0162371 | A1 * | 7/2006 | Lui | B64D 13/06 62/402 |
| 2007/0006607 | A1 * | 1/2007 | Hunt | B64D 13/06 62/402 |
| 2007/0266695 | A1 * | 11/2007 | Lui | B64D 13/06 60/204 |
| 2013/0306159 | A1 * | 11/2013 | Payri | F02M 35/10242 137/12 |
| 2015/0251766 | A1 * | 9/2015 | Atkey | B64D 13/08 60/785 |
| 2015/0307196 | A1 * | 10/2015 | Bruno | F02C 6/08 62/61 |
| 2016/0096629 | A1 | 4/2016 | Vaisman | |
| 2020/0108937 | A1 * | 4/2020 | Behrens | F02C 9/18 |

FOREIGN PATENT DOCUMENTS

| | | | |
|---|---|---|---|
| EP | 1695910 A2 | 8/2006 | |
| EP | 3342709 A1 * | 7/2018 | B64D 13/02 |
| JP | 2004022230 A * | 1/2004 | |
| JP | 2004142501 A * | 5/2004 | |

OTHER PUBLICATIONS

EP3342709 (Year: 2018).*
DE3807372A1 (Year: 2024).*
JP-2004022230-A (Year: 2024).*
European Search Report; European Application No. 21208066.7; Date: Jun. 21, 2022; 13 pages.
European Partial Search Report; European Application No. 21208066.7; Date: Mar. 16, 2022; 8 pages.
European Office Action for European Application No. 21208066.7; Report Mail Date Dec. 22, 2023 (5 Pages).

* cited by examiner

FIG. 2

ENVIRONMENTAL CONTROL SYSTEM FOR SUPERSONIC COMMERCIAL AIRCRAFT

CROSS-REFERENCE TO RELATED APPLICATIONS

This application claims the benefit of U.S. Provisional Application No. 63/112,923 filed Nov. 12, 2020, the disclosure of which is incorporated herein by reference in its entirety.

BACKGROUND

Embodiments of the disclosure relate to environmental control systems, and more specifically to an environmental control system of an aircraft.

Aircraft need to have their internal environment controlled. In general, contemporary air conditioning systems are supplied a pressure at cruise that is approximately 30 psig to 35 psig. The trend in the aerospace industry today is towards systems with higher efficiency. This is particularly true for aircrafts that operate at supersonic conditions at cruise. During supersonic operation, engine bleed pressures will typically be much higher than subsonic cruise; therefore, the fuel burn penalty of using this air becomes higher and it becomes all the more important that the air conditioning system is efficient with the bleed flow used to perform its ventilation and temperature conditioning functions.

BRIEF DESCRIPTION

According to an embodiment, an environmental control system includes a cooling circuit having at least one heat exchanger for cooling a first medium therein. At least one compressing device is operably coupled to the cooling circuit. The at least one compressing device includes a first compressor and a second compressor, wherein the first medium is provided to the first compressor and the second compressor in series, and a temperature of the first medium provided to an inlet of the second compressor is less than the temperature of the first medium at an outlet of the first compressor.

In addition to one or more of the features described above, or as an alternative, in further embodiments the first medium is cooled within the at least one heat exchanger by a second medium.

In addition to one or more of the features described above, or as an alternative, in further embodiments the second medium is fuel.

In addition to one or more of the features described above, or as an alternative, in further embodiments the at least one heat exchanger of the cooling circuit includes an intercooler heat exchanger, the intercooler heat exchanger being located between the first compressor and the second compressor relative to a flow of the first medium.

In addition to one or more of the features described above, or as an alternative, in further embodiments the at least one heat exchanger of the cooling circuit further includes a primary heat exchanger located upstream from the first compressor relative to the flow of the first medium, and a secondary heat exchanger located downstream of the second compressor relative to the flow of the first medium.

In addition to one or more of the features described above, or as an alternative, in further embodiments within the cooling circuit, the primary heat exchanger and the intercooler heat exchanger are arranged in parallel relative to a flow of the second medium.

In addition to one or more of the features described above, or as an alternative, in further embodiments within the cooling circuit, the intercooler heat exchanger and the primary heat exchanger are arranged in series relative to a flow of the second medium.

In addition to one or more of the features described above, or as an alternative, in further embodiments within the cooling circuit, the secondary heat exchanger and the intercooler heat exchanger are arranged in parallel relative to the flow of the second medium.

According to an embodiment, an environmental control system includes an inlet for receiving a first medium and an outlet for delivering a conditioned flow of the first medium to one or more loads. A first compressing device and a second compressing device are arranged in fluid communication with the inlet and the outlet. Each of the first compressing device and the second compressing device includes a compressor and a turbine operably coupled via a shaft. In a first mode of operation, the first medium bypasses the second compressing device and in a second mode of operation, the first medium is provided to both the first compressing device and the second compressing device in series.

In addition to one or more of the features described above, or as an alternative, in further embodiments in the second mode of operation, the first medium is provided to the turbine of the first compressing device and the turbine of the second compressing device in series.

In addition to one or more of the features described above, or as an alternative, in further embodiments the first medium is provided from the turbine of the first compressing device directly to the turbine of the second compressing device.

In addition to one or more of the features described above, or as an alternative, in further embodiments in the second mode of operation, the first medium is provided to the compressor of the first compressing device and the compressor of the second compressing device in series.

In addition to one or more of the features described above, or as an alternative, in further embodiments in the second mode of operation, wherein the first medium is cooled between the compressor of the first compressing device and the compressor of the second compressing device.

In addition to one or more of the features described above, or as an alternative, in further embodiments comprising a cooling circuit including at least one heat exchanger, wherein the at least one heat exchanger includes an intercooler heat exchanger located between the compressor of the first compressing device and the compressor of the second compressing device relative to a flow of the first medium.

In addition to one or more of the features described above, or as an alternative, in further embodiments the first medium is cooled within the at least one heat exchanger by a flow of fuel.

In addition to one or more of the features described above, or as an alternative, in further embodiments the environmental control system is part of an aircraft and first mode of operation is associated with operation of the aircraft at ground conditions or at subsonic flight.

In addition to one or more of the features described above, or as an alternative, in further embodiments the second mode of operation is associated with operation of the aircraft at supersonic flight or climb.

According to an embodiment, an environmental control system includes an inlet for receiving a first medium and an outlet for delivering a conditioned flow of the first medium to one or more loads, and a cooling circuit including at least one heat exchanger. The first medium is cooled within the at least one heat exchanger by a second medium. At least one compressing device is operably coupled to the cooling circuit. The at least one compressing device includes at least one compressor and at least one turbine. The environmental control system is operable in a plurality of modes, and in each of the plurality of modes the second medium is fuel.

In addition to one or more of the features described above, or as an alternative, in further embodiments the at least one compressing device includes a first turbine and a second turbine, and in a first mode of the plurality of modes, the first medium bypasses one of the first turbine and the second turbine, and in a second mode of the plurality of modes, the first medium is provided to the first turbine and the second turbine in series.

In addition to one or more of the features described above, or as an alternative, in further embodiments the at least one compressing device includes a first compressor and a second compressor, and in a first mode of the plurality of modes, the first medium is provided to at least one of the first compressor and the second compressor, and in a second mode of the plurality of modes, the first medium is provided to the first compressor and the second compressor in series.

BRIEF DESCRIPTION OF THE DRAWINGS

The following descriptions should not be considered limiting in any way. With reference to the accompanying drawings, like elements are numbered alike:

FIG. 2 is a simplified schematic of an environmental control system according to another embodiment;

DETAILED DESCRIPTION

A detailed description of one or more embodiments of the disclosed apparatus and method are presented herein by way of exemplification and not limitation with reference to the Figures.

Embodiments herein provide an environmental control system of an aircraft that mixes mediums from different sources to power the environmental control system and to provide cabin pressurization and cooling at a high fuel burn efficiency. The medium can generally be air, while other examples include gases, liquids, fluidized solids, or slurries.

Figure 1:
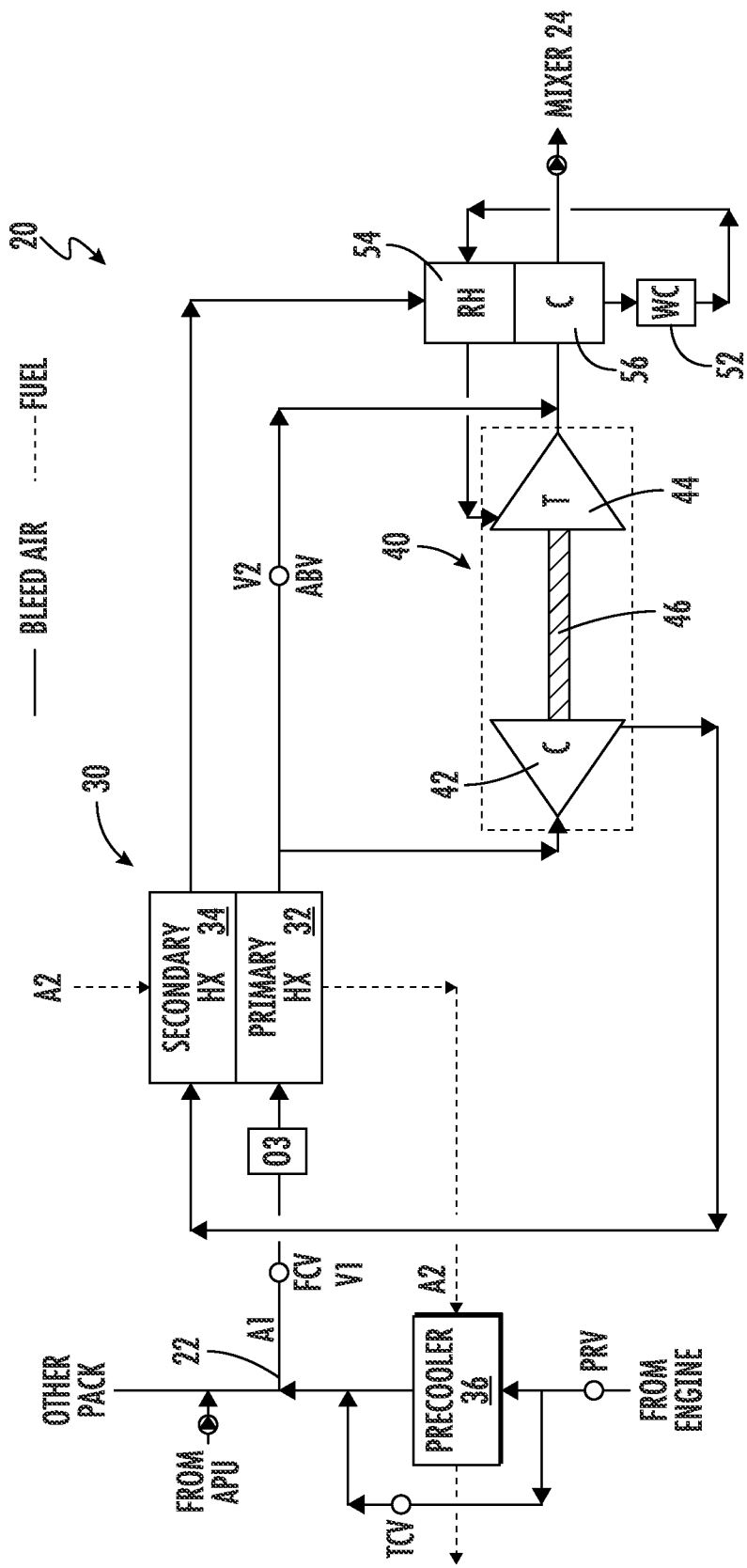
FIG. 1 is a simplified schematic of an environmental control system according to an embodiment.

With reference now to FIG. 1, a schematic diagram of a portion of an environment system (ECS) 20, such as an air conditioning unit or pack for example, is depicted according to non-limiting embodiments. Although the environmental control system 20 is described with reference to an aircraft, alternative applications are also within the scope of the disclosure. As shown in the FIGS., the system 20 can receive a first medium A1 at a first inlet 22 and is configured to provide a conditioned form of the first medium A1 to a volume 24. In embodiments where the environmental control system 20 is used in an aircraft application, the first medium A1 is bleed air, which is pressurized air originating from i.e. being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

The environmental control system 20 includes a cooling circuit 30 including one or more heat exchangers. A second medium A2 is provided to the one or more heat exchangers of the cooling circuit 30. In the illustrated, non-limiting embodiment, the second medium A2 is fuel used to operate the aircraft. For example, a fuel-to-air heat exchanger of the fuel system may be integrated into the cooling circuit 30 of the environmental control system 20. However, any suitable medium, such as cabin discharge air, or a fluid from another system onboard the aircraft is within the scope of the disclosure. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, barrier-layer, and fluid heat exchangers.

The one or more heat exchangers may be referred to as cooling heat exchangers. In the illustrated, non-limiting embodiment, the cooling heat exchangers include a first or primary heat exchanger 32 and a second or secondary heat exchanger 34. At the heat exchangers 32, 34, the second medium A2 acts as a heat sink to cool another medium passing through the heat exchanger, for example the first medium A1. In an embodiment, the cooling circuit 30 additionally includes a third heat exchanger 36 located downstream from the first and second heat exchangers 32, 34 relative to the flow of the second cooling medium A2. In the illustrated, non-limiting embodiment, the first medium A1 is provided to the inlet 22 of the environmental control system 20 from a separate bleed air system and the third heat exchanger or precooler 36 is arranged as part of the bleed air system. However, embodiments where the precooler 36 is arranged directly downstream from the inlet 22 of the first medium A1 to the environmental control system 20 are also within the scope of the disclosure.

The system 20 additionally comprises at least one compressing device 40. The compressing device 40 of the system 20 is a mechanical device that includes components for performing thermodynamic work on a medium (e.g., extracts work from or applies work to the first medium A1 by raising and/or lowering pressure and by raising and/or lowering temperature). Examples of a compressing device 40 include an air cycle machine, such as a two-wheel air cycle machine (FIG. 1), a three-wheel air cycle machine (FIG. 2), a four-wheel air cycle machine (FIG. 3), etc.

Figure 2:
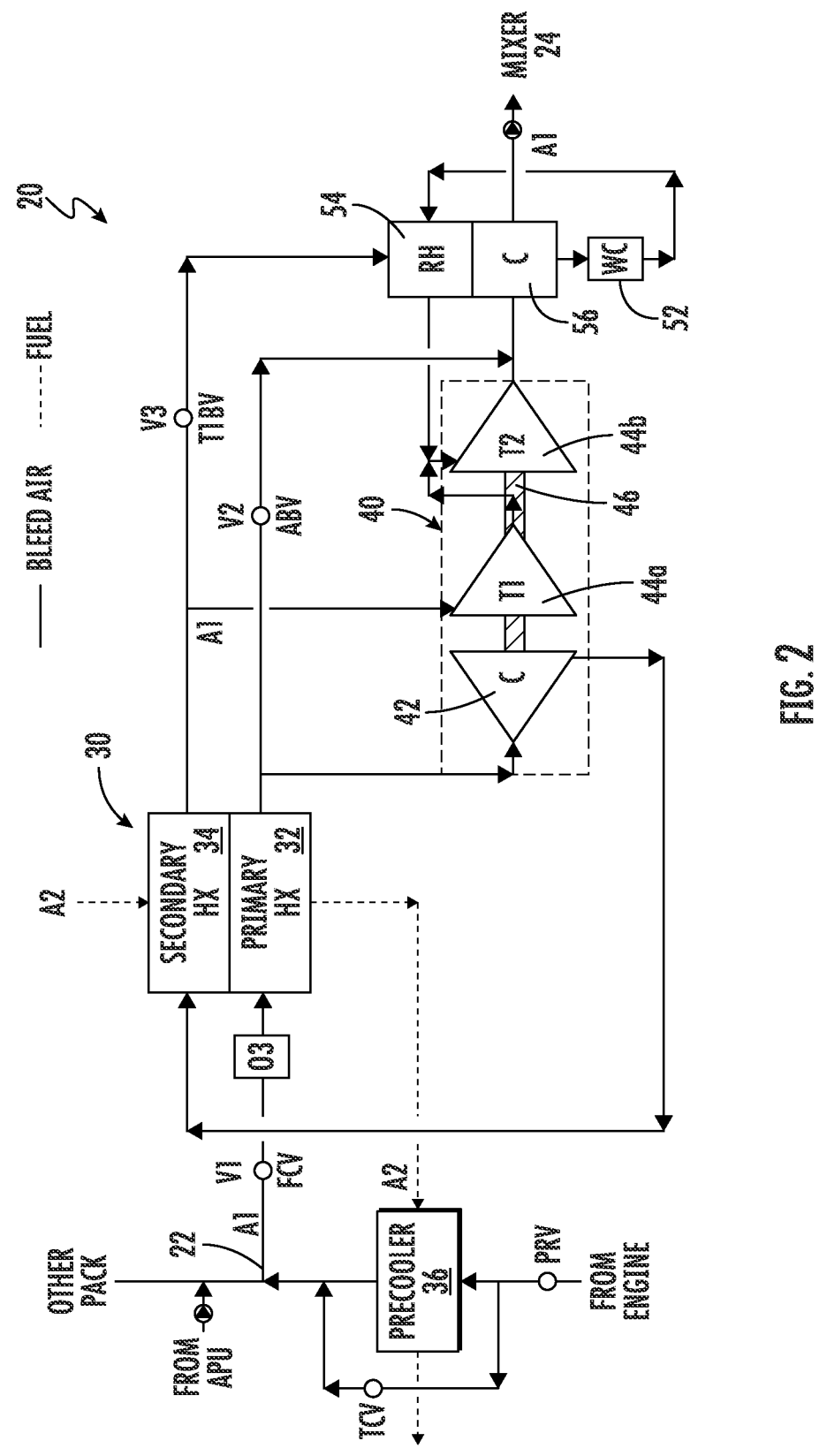
Figure 2A:
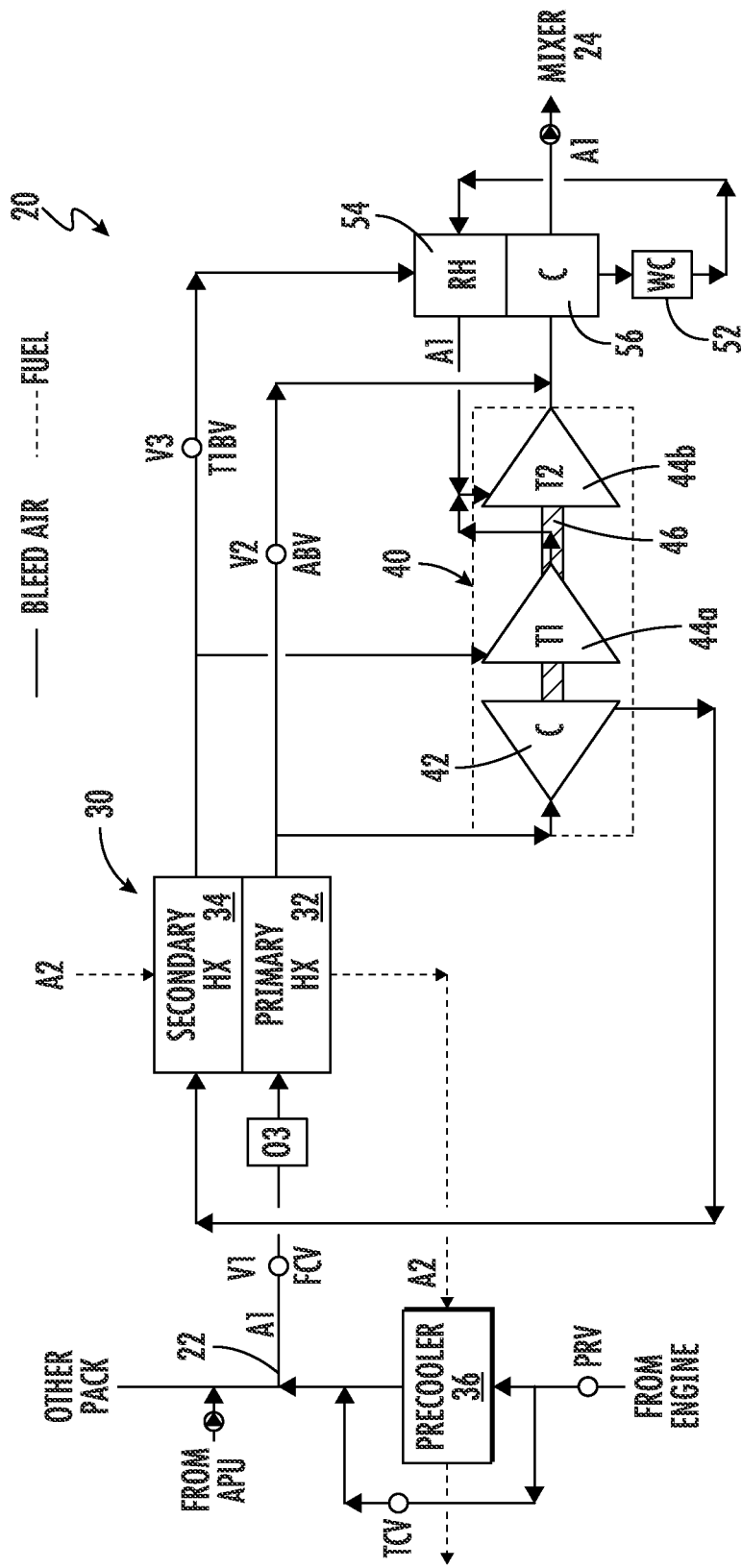
FIG. 2A is a simplified schematic of the environmental control system of FIG. 2 in a first operating mode according to an embodiment.
Figure 2B:
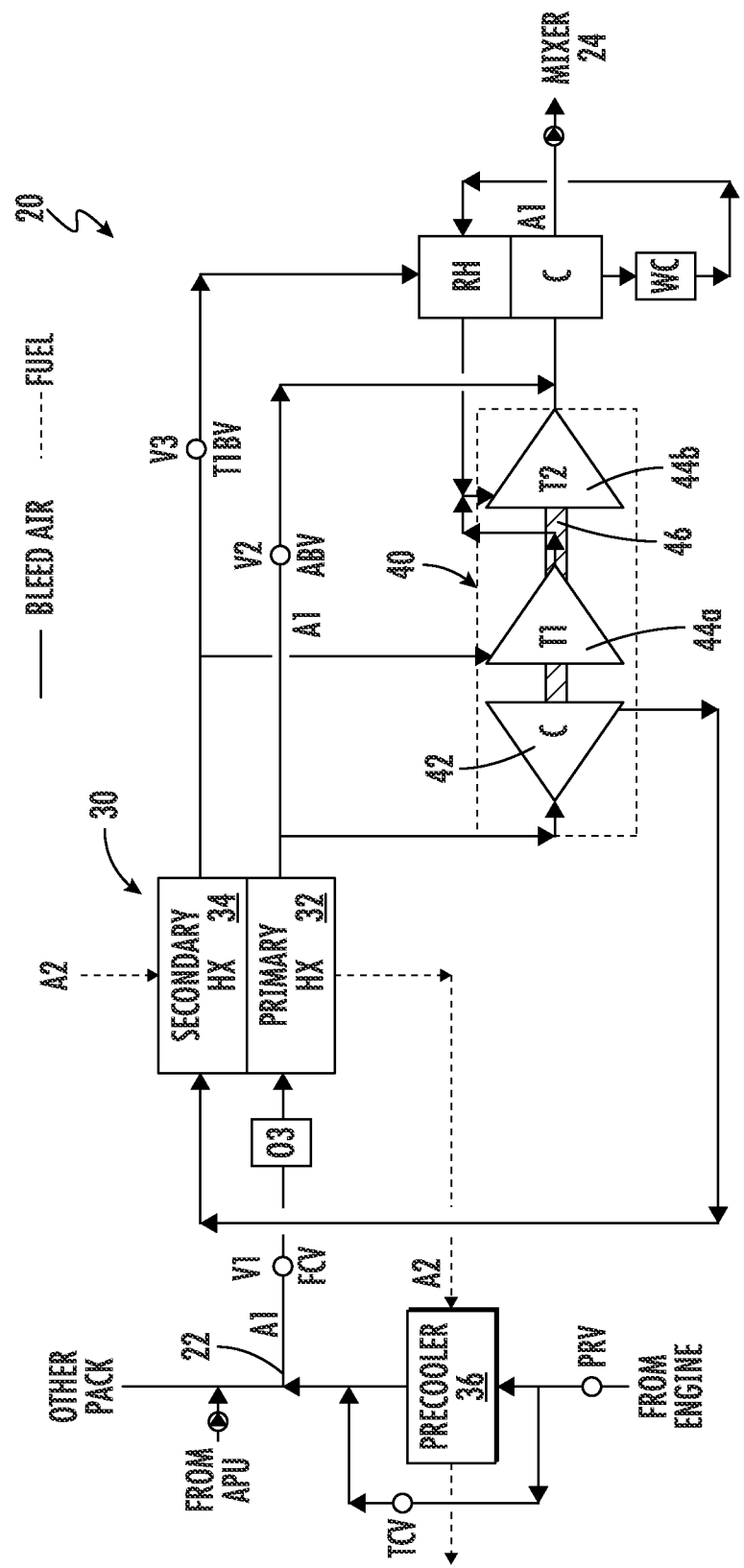
FIG. 2B is a simplified schematic of the environmental control system of FIG. 2 in a second operating mode according to an embodiment.
Figure 3:
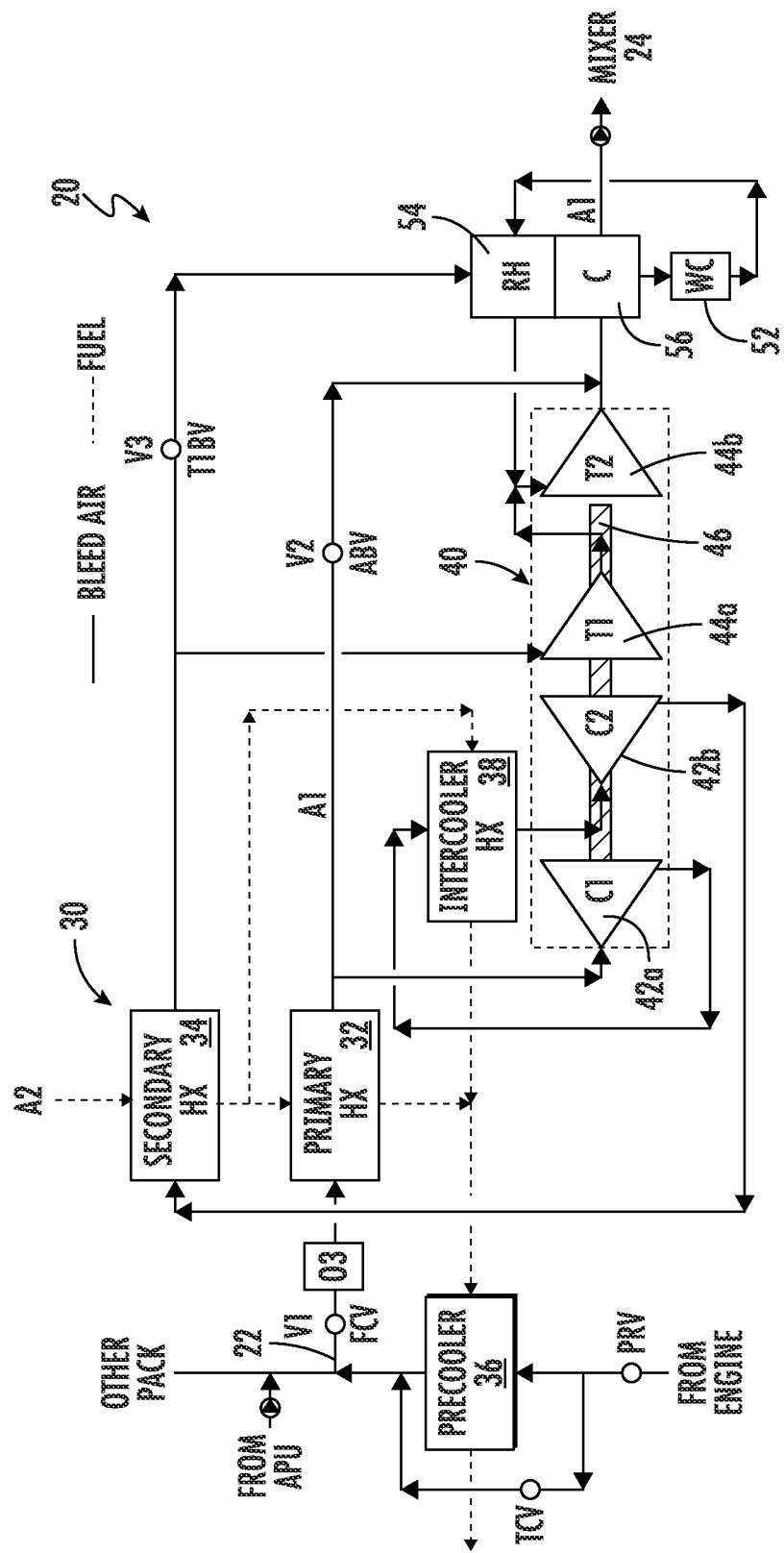
FIG. 3 is a simplified schematic of the environmental control system according to another embodiment.

In the non-limiting embodiments of FIGS. 1-4, each compressing device 40 includes at least one compressor 42 and at least one turbine 44 operably coupled to each other via a shaft 46. In an embodiment, the compressing device 40 includes only a compressor 42 and a turbine 44 coupled via a shaft 46 (see FIG. 1). In another embodiment, as shown in FIG. 3, the compressing device 40 includes a first compressor 42*a* and a second compressor 42*b* mounted to the same shaft 46. Alternatively, or in addition, as shown in FIGS. 2 and 3, the compressing device 40 may include a first turbine 44*a* and a second turbine 44*b* mounted to the same shaft 46.

The compressor 42 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the second medium A2. The turbine 44 is a mechanical device that expands a medium and extracts work therefrom (also referred to as extracting energy) to drive the compressor 42 via the shaft 46. In embodiments including a plurality of turbines, the turbines 44*a*, 44*b* may be operable independently or in combination, to drive the at least one compressor 42.

The system 20 may additionally include a dehumidification system. In the illustrated, non-limiting embodiment of FIG. 1, the dehumidification system includes a water extractor or collector 52 arranged in fluid communication with the first medium A1. The water collector 52 is a mechanical device that performs a process of removing water from a medium. In an embodiment, the dehumidification system may additionally include a reheater 54 and a condenser 56 arranged upstream from the water collector 52. The condenser 56 and the reheater 54 are particular types of heat exchangers. Together, the reheater 54, condenser 56, and water collector 52 form a water separator, such as a high pressure water separator for example, because the first medium is at its highest pressure within the system when provided to the water separator.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system 20 can be regulated to a desired value. For instance, a first valve V1 may be configured to control a supply of the first medium A1 to the system 20. Operation of a second valve V2 may be used to allow a portion of the first medium A1 to bypass the compressing device 40. A third valve V3, may be used to control a flow of the first medium A1 provided to the dehumidification system.

With continued reference to FIG. 1, during normal operation of the environmental control system 20, the first medium A1, such as bleed air drawn from an engine or APU, is provided from the inlet 22 to the cooling circuit 30. As shown in FIG. 1, the hot, high pressure first medium A1 is provided to the primary heat exchanger 32 where the first medium A1 is cooled by the second medium A2 as it passes through the cooling circuit 30. From the primary heat exchanger 32, the first medium A1 flows to the compressor 42 of the compressing device 40. The act of compressing the first medium A1 heats the first medium A1 and increases the pressure of the first medium A1.

The first medium A1 output from the compressor 42 is provided to the secondary heat exchanger 34 where it is cooled by the flow of second medium A2. The first medium A1 exiting the secondary heat exchanger 34 is then provided to the reheater 54, condenser 56, and water collector 52 in series. Within the reheater 54 and condenser 56, the flow of first medium A1 is further cooled, and within the water collector 52, any free moisture is removed, to produce a cool high pressure air. This cool pressurized first medium A1 is then provided to a second pass of the reheater 54, in which the first medium A1 is heated, before being provided the turbine 44. The first medium A1 is expanded across the turbine 44 and work is extracted therefrom to drive the compressor 42 via rotation of the shaft 46. The first medium A1 output from the turbine 44 has a reduced temperature and pressure relative to the first medium A1 provided to the inlet of the turbine 44. From the outlet of the turbine 44, the first medium A1 is heated via a second pass through the condenser 56, before being delivered to one or more loads, such as the volume 24 for example.

With reference now to FIGS. 2, 2A and 2B, an example of the environmental control system 20 according to another embodiment is illustrated. In this embodiment, the compressing device 40 includes two turbines 44*a*, 44*b* mounted to the shaft 46. However, the remaining components of the system 20 are substantially identical to the system of FIG. 1. The system 20 of FIG. 2 is operable in a plurality of modes, selectable based on a flight condition of the aircraft. For example, the system 20 may be operable in a first, low altitude mode or a second, high altitude mode. The first, low altitude and subsonic mode is typically used for ground and low altitude flight conditions, such as ground idle, taxi, take-off, hold, descent. and subsonic cruise conditions, and the second, high altitude mode may be used at climb and high altitude supersonic cruise flight conditions.

With reference now to FIG. 2A, operation of the environmental control system 20 in a first mode, such as during subsonic and/or low altitude flight for example is illustrated. As previously described, a flow of a first medium A1 is provided from an inlet 22 of the environmental control system 20 to a primary heat exchanger 32. The first medium A1 may have been cooled within the precooler 36 before reaching the inlet 22 of the environmental control system 20, as shown in the FIGS. Within the primary heat exchanger 32, and in some embodiments the precooler 36, the first medium A1 Is cooled via a heat exchange relationship with a second medium A2. From the primary heat exchanger 32, the cool pressurized first medium A1 is provided to a compressor 42 of the compressing device 40, where the pressure and the temperature of the first medium A1 is increased. From the compressor 42, the first medium A1 is delivered to an inlet of a secondary heat exchanger 34, in which the first medium A1 is cooled via a flow of the second medium A2.

During operation in the first mode, valve V3 is positioned such that the first medium A1 is configured to bypass the first turbine 44*a* of the compressing device 40. Accordingly, the substantial entirety of the first medium A1 exiting the secondary heat exchanger 34 passes through the valve V3, to the reheater 54, condenser 56, and water collector 52 in series. As previously described, within the reheater 54 and condenser 56, the flow of first medium A1 is further cooled, and within the water collector 52, free moisture within the first medium A1 is removed, to produce a cool high pressure air. This cool pressurized first medium A1 is then provided to a second pass of the reheater 54, in which the first medium A1 is heated, before being provided the second turbine 44*b*. The first medium A1 is expanded across the turbine 44*b* and work is extracted therefrom to drive the compressor 42 via rotation of the shaft 46. The first medium A1 output from the second turbine 44*b* has a reduced temperature and pressure relative to the first medium A1 provided to the inlet of the second turbine 44*b*. From the outlet of the second turbine 44*b*, the first medium A1 is heated via a second pass through the condenser 56, before being delivered to one or more loads, such as the volume 24 for example.

In a second mode of operation (FIG. 2B), such as associated with climb or supersonic high altitude cruise condition for example, both the first turbine 44a and the second turbine 44b of the compressing device 40 are utilized. Further, the first and the second turbine 44a, 44b may be arranged in series relative to the flow of the first medium A1. The second mode of operation of the environmental control system 20 is similar to the first mode of operation. Accordingly, the same second medium A2, such as fuel for example, is used to cool the first medium A1 within the cooling circuit 30 in both the first and second modes of operation. However, in the second mode of operation, valve V3 is closed, such that all or at least a portion of the flow of first medium A1 at the outlet of the secondary heat exchanger 34 is provided to the first turbine 44a. Within the first turbine 44a, work is extracted from the first medium A1 to drive the compressor 42 via rotation of the shaft 46. From the outlet of the first turbine 44a, the flow of first medium A1 may be provided directly to the inlet of the second turbine 44b, wherein additional work is extracted from the first medium A1. The flow of first medium A1 having a reduced pressure and temperature is then provided to the one or more loads of the vehicle, such as the volume 24 for example. In this supersonic, high altitude second mode of operation, the environmental control system 20 is configured to take advantage of the excess pressure of the first medium A1 when the engine is in a climb or supersonic cruise condition.

With reference now to FIG. 3, another embodiment of an environmental control system 20 is illustrated. The configuration of the system of FIG. 3 is similar to the system of FIG. 2; however, in the embodiment of FIG. 3, the compressing device 40 includes both a first compressor 42a and a second compressor 42b, and the cooling circuit 30 includes an additional intercooler heat exchanger 38. Accordingly, operation of the environmental control system of FIG. 3, is also similar to operation of the environmental control system of FIG. 2 in both a first, subsonic, ground or low altitude mode and a second, supersonic high altitude mode. In the system of FIG. 3, during normal operation of both the first and second mode, the first medium A1 output from the primary heat exchanger 32 is delivered to the first compressor 42a. Within the first compressor 42a, the first medium A1 is compressed causing the temperature and the pressure of the first medium A1 to increase. The heated, pressurized first medium A1 output from the first compressor 42a is then cooled within the intercooler heat exchanger 38 disposed between the first compressor 42a and the second compressor 42b.

Figure 4:
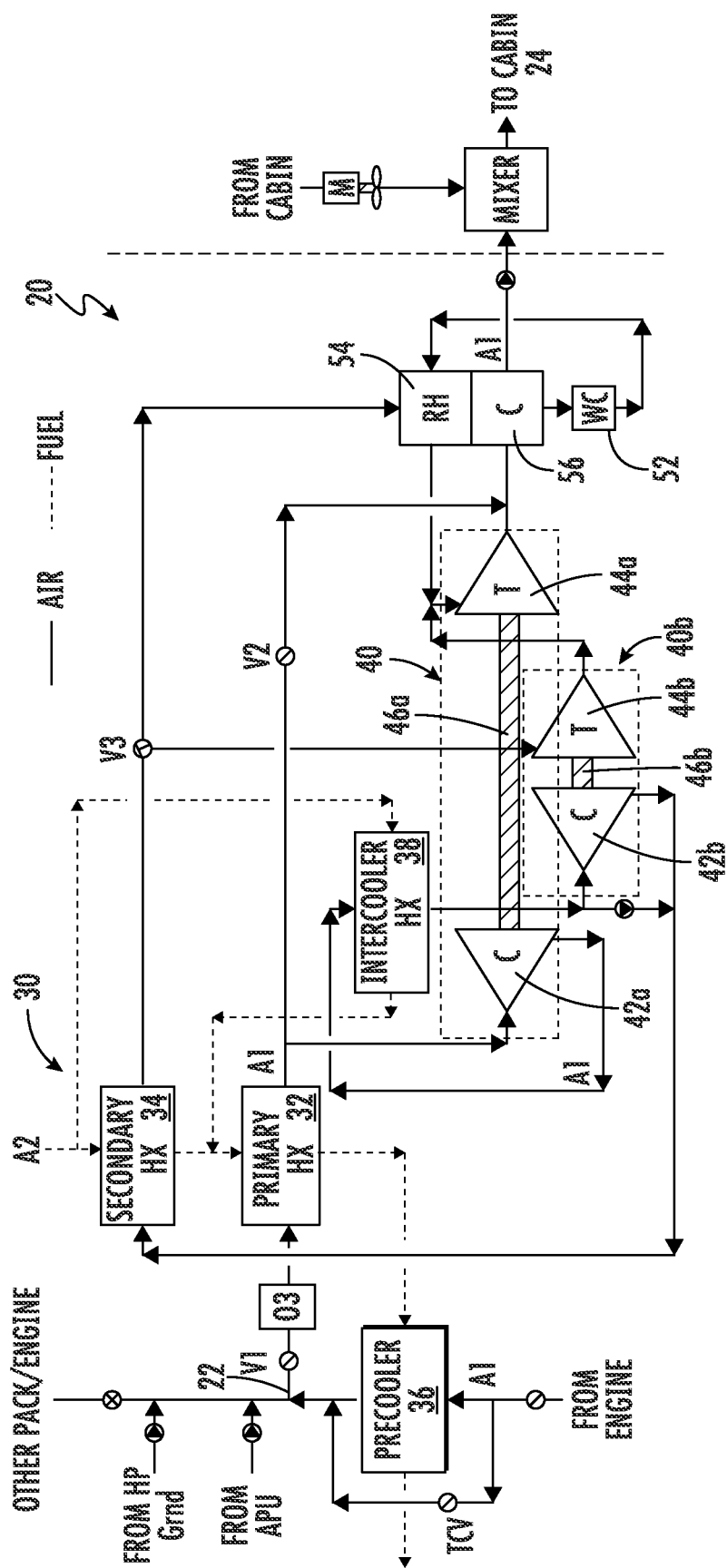
FIG. 4 is a simplified schematic of the environmental control system according to another embodiment.

In the illustrated, non-limiting embodiment of FIG. 3, the intercooler heat exchanger 38 is arranged in parallel with the primary heat exchanger 32 within the cooling circuit 30 relative to the flow of the second medium A2. In such embodiments, the flow output from both the primary heat exchanger 32 and the intercooler heat exchanger 38 may be rejoined upstream from the precooler 36. However, in other embodiments, the intercooler heat exchanger 38 may be arranged in series with the primary heat exchanger 32 relative to a flow of the second medium A2, as shown in FIG. 4. Further, although the flow of the second medium A2 provided to the intercooler heat exchanger 38 is illustrated in FIG. 3 as being provided from downstream of the secondary heat exchanger 34, in other embodiments, the second medium A2 may be provided from another portion of the cooling circuit 30, such as from downstream of primary heat exchanger 32 or from upstream of the secondary heat exchanger 34 (FIG. 4) for example. In the non-limiting embodiment of FIG. 4, the intercooler heat exchanger 38 is arranged in parallel with the secondary heat exchanger 34 relative to the flow of the second medium A2, and the two flows may be rejoined upstream from the primary heat exchanger 32.

The cooler, high pressure first medium A1 output from the intercooler heat exchanger 38 is provided to an inlet of the second compressor 42b. By cooling the flow of the first medium A1 between the first and second compressor 42a, 42b, the heated first medium A1 output from the second compressor 42b may be at a temperature compatible for use with the remainder of the environmental control system 20 and improves the efficiency of the overall compression process compared to a single compressor. From the second compressor 42b, the flow of first medium A1 is provided to the secondary heat exchanger 34, and then to the downstream components of the system 20 in a manner identical to the modes of operation of the environmental control system 20 illustrated and described with respect to FIG. 2.

Figure 4A:
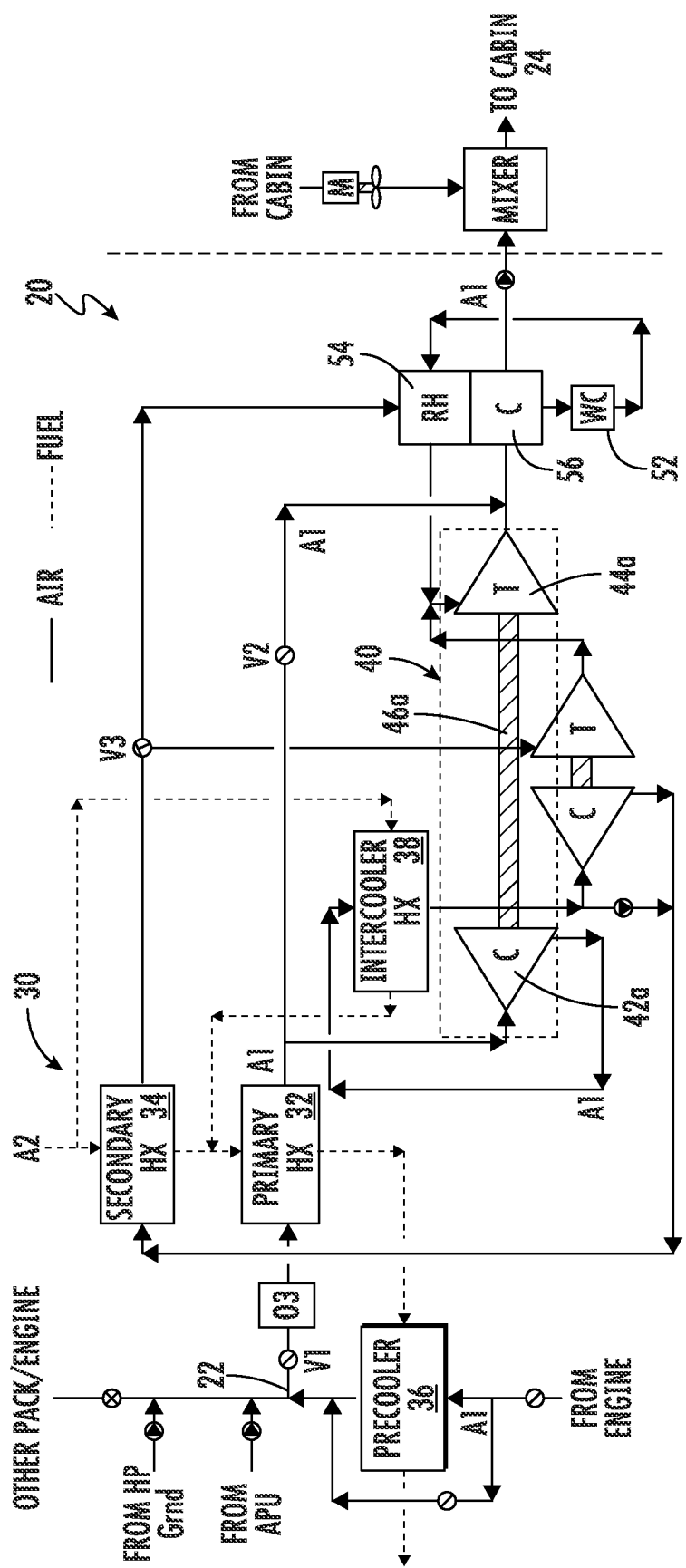
FIG. 4A is a simplified schematic of the environmental control system of FIG. 4 in a first operating mode according to an embodiment.
Figure 4B:
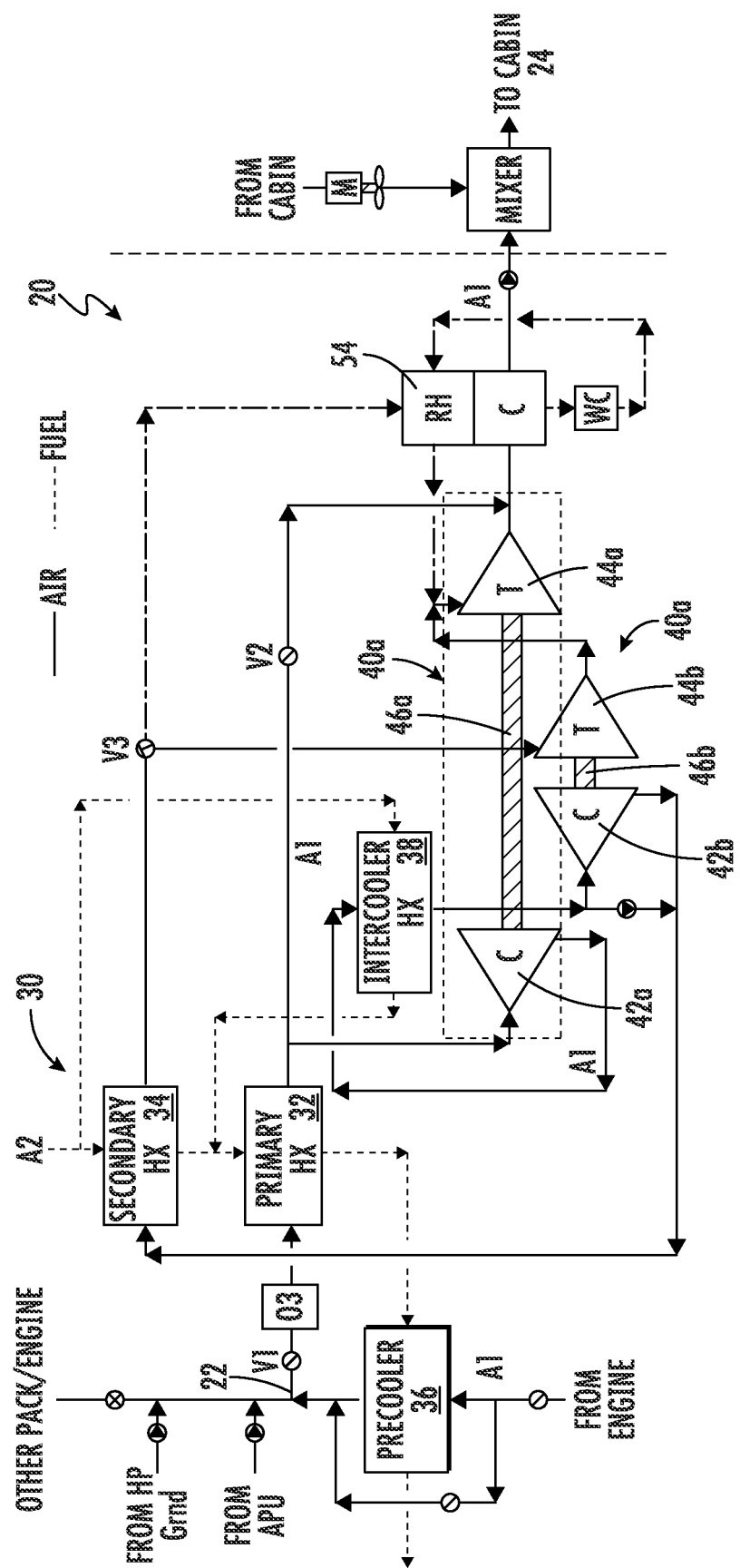
FIG. 4B is a simplified schematic of the environmental control system of FIG. 4 in a second operating mode according to an embodiment.

Yet another embodiment of the environmental control system 20 is illustrated in FIGS. 4, 4A, and 4B. The embodiment of FIG. 4 has similar components to the embodiment of FIG. 3. However, instead of two compressors and two turbines being mounted on a single shaft as a four wheel compressing device, the environmental control system 20 includes a distinct first compressing device 40a and second compressing device 40b. In the illustrated, non-limiting embodiment, each compressing device 40a, 40b includes a compressor 42a, 42b, and a turbine 44a, 44b, connected by a shaft 46a, 46b, respectively. Although the shafts 46a, 46b of the two compressing devices 40a, 40b are shown as being oriented substantially parallel to one another, embodiments where the compressing devices 40a, 40b are arranged in a non-parallel orientation are also contemplated herein. Further, it should be understood that embodiments where one or both of the compressing devices 40a, 40b includes additional components, and therefore are configured as a three or four wheel air cycle machine for example, are also within the scope of the disclosure.

During operation in a first, ground or low altitude mode (FIG. 4a) the first medium A1 output from the primary heat exchanger 32 is delivered to the first compressor 42a. Within the first compressor 42a, the first medium A1 is compressed causing the temperature and the pressure of the first medium A1 to increase. The heated, pressurized first medium A1 output from the first compressor 42a is then cooled within the intercooler heat exchanger 38. In an embodiment, the flow of first medium A1 output from the intercooler heat exchanger 38 is configured to bypass the second compressor 42b. However, in other embodiments, the flow is further heated and pressurized within the second compressor 42b. Accordingly, the flow of first medium A1 that has bypassed the second compressor 42b, or alternatively, the flow output from the second compressor 42b, is provided to the secondary heat exchanger 34 where the flow is cooled by the second medium A2.

As previously described, in the first mode, valve V3 is positioned such that the first medium A1 is configured to bypass one of the turbines, such as the turbine 44b of the second compressing device 40b. Accordingly, the substantial entirety of the first medium A1 exiting the secondary heat exchanger 34 is provided to the reheater 54, condenser 56, and water collector 52 in series. The heated flow of the first medium A1 output from the second pass of the reheater 54 is provided the inlet of the turbine 44a of the first compressing device 40a. The first medium A1 is expanded across the turbine 44a and work is extracted therefrom to drive the compressor 42a via rotation of the shaft 46a. The first medium A1 output from the turbine 44a has a reduced temperature and pressure relative to the first medium A1 provided to the inlet of the turbine 44a. From the outlet of the turbine 44a, the first medium A1 is heated via a second pass through the condenser 56, before being delivered to one or more loads, such as the volume 24 for example. It should be understood that in some embodiments, in the first mode of operation, the first medium A1 is configured to bypass both the compressor 42b and the turbine 44b of the second compressing device 40b. Accordingly, in the ground mode, only one of the two compressing devices 40a, 40b of the system is operational, or said another way, the flow of the first medium A1 bypasses one of the compressing devices 40a, 40b.

However, in the second mode of operation associated with supersonic high altitude flight (see FIG. 4b), the first compressor 42a and the second compressor 42b are arranged in series relative to the flow of the first medium A1 and the second turbine 44b and the first turbine 44a are arranged in series relative to the flow of the first medium A1. In the second mode of operation, all or at least a portion of the flow of first medium A1 at the outlet of the secondary heat exchanger 34 is provided to the turbine 44b of the second compressing device 40b. Within the turbine 44b, work is extracted from the first medium A1 to drive the second compressor 42b via rotation of the shaft 46b. From the outlet of the turbine 44b, the flow of first medium A1 may be provided directly to the inlet of the turbine 44a of the first compressing device 40a, wherein additional work is extracted from the first medium A1. The flow of first medium A1 having a reduced pressure and temperature is provided to the one or more loads of the vehicle, such as the volume 24 for example.

By providing the first medium A1 to multiple turbines 44a, 44b in series, the total amount of work extracted therefrom can be maximized while limiting the pressure ratios required at each turbine 44a, 44b. As used herein, the term "pressure ratio" is intended to describe the ratio of the pressure of the medium provided to an inlet of the turbine and the pressure of the medium provided at the outlet of the turbine. In an embodiment, such as embodiments of the system 20 including a plurality of turbines 44a, 44b arranged in series relative to a flow of a medium, the pressure ratio of each of the turbines may be reduced compared to conventional turbines. By using a plurality of turbines having a reduced pressure ratio in series, the energy extracted from the medium within the turbines may be maximized. However, in other embodiments, the pressure ratio of each turbine may be similar to existing turbines. In such embodiments, the system 20 may be capable of maximizing the energy extracted from a medium that has a pressure greater than existing mediums. For example, bleed air provided to conventional systems may have a pressure up to about 30 psig. The system 20 described herein may be capable of maximizing energy from a medium having a pressure significantly greater than the pressure of existing systems, for example during supersonic flight.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system comprising:
   a cooling circuit including at least one heat exchanger, wherein a first medium is cooled within the at least one heat exchanger by a second medium, the at least one heat exchanger including a first heat exchanger, an intercooler heat exchanger, and a second heat exchanger, and
   at least one compressing device operably coupled to the cooling circuit, the at least one compressing device including a first compressor and a second compressor, wherein the first medium is provided to the first compressor and the second compressor in series;
   wherein the first heat exchanger is arranged upstream from the first compressor relative to a flow of the first medium, the second heat exchanger is arranged downstream from the second compressor and upstream from the first turbine relative to the flow of the first medium, and the intercooler heat exchanger is positioned downstream from the first compressor and upstream from the second compressor relative to the flow of the first medium such that a temperature of the first medium provided to an inlet of the second compressor is less than the temperature of the first medium at an outlet of the first compressor;
   wherein the second medium is fuel.

2. The environmental control system of claim 1, wherein within the cooling circuit, the primary heat exchanger and the intercooler heat exchanger are arranged in parallel relative to a flow of the second medium.

3. The environmental control system of claim 1, wherein within the cooling circuit, the secondary heat exchanger and the intercooler heat exchanger are arranged in parallel relative to the flow of the second medium.

4. An environmental control system of comprising:
   an inlet for receiving a first medium and an outlet for delivering a conditioned flow of the first medium to one or more loads; and
   a first compressing device and a second compressing device arranged in fluid communication with the inlet and the outlet and with each other, each of the first compressing device and the second compressing device including a compressor and a turbine operably coupled via a shaft;

at least one heat exchanger fluidly connected to at least one of the first compressing device and the second compressing device;

a dehumidification system fluidly connected directly to an outlet of the turbine of the first compressing device and fluidly connected directly to the at least one heat exchanger via a valve;

wherein in a first mode of operation, the first medium output from the compressor of the first compressing device bypasses both the compressor and the turbine of the second compressing device and in a second mode of operation, the first medium is provided to the turbines of both the first compressing device and the second compressing device in series with the turbine of the second compressing device being arranged upstream from the turbine of the first compressing device relative to a flow of the first medium.

5. The environmental control system of claim 4, wherein in the second mode of operation, the first medium is provided to the turbine of the first compressing device and the turbine of the second compressing device in series.

6. The environmental control system of claim 4, wherein the first medium is provided from the turbine of the first compressing device directly to the turbine of the second compressing device.

7. The environmental control system of claim 4, wherein in the second mode of operation, the first medium is provided to the compressor of the first compressing device and the compressor of the second compressing device in series.

8. The environmental control system of claim 7, wherein in the second mode of operation, wherein the first medium is cooled between the compressor of the first compressing device and the compressor of the second compressing device.

9. The environmental control system of claim 8, further comprising a cooling circuit including at least one heat exchanger, wherein the at least one heat exchanger includes an intercooler heat exchanger located between the compressor of the first compressing device and the compressor of the second compressing device relative to a flow of the first medium.

10. The environmental control system of claim 9, wherein the first medium is cooled within the at least one heat exchanger by a flow of fuel.

11. The environmental control system of claim 4, wherein the environmental control system is part of an aircraft and first mode of operation is associated with operation of the aircraft at ground conditions or at subsonic flight.

12. The environmental control system of claim 4, wherein the second mode of operation is associated with operation of the aircraft at supersonic flight or climb.

13. An environmental control system comprising:

an inlet for receiving a first medium and an outlet for delivering a conditioned flow of the first medium to one or more loads including a cabin;

a cooling circuit including a plurality of heat exchangers, wherein the first medium is cooled within the plurality of heat exchangers by a second medium, the plurality of heat exchanger including at least two heat exchangers; and at least one compressing device operably coupled to the cooling circuit, the at least one compressing device including at least one compressor and at least one turbine operably coupled by a shaft, the at least two heat exchangers being arranged downstream from the at least one compressor relative to a flow of the first medium, wherein the environmental control system is operable in a plurality of modes, and in each of the plurality of modes the second medium is fuel and is provided to each of the at least two heat exchangers in parallel.

14. The environmental control system of claim 13, wherein the at least one compressing device includes a first turbine and a second turbine, and in a first mode of the plurality of modes, the first medium bypasses one of the first turbine and the second turbine, and in a second mode of the plurality of modes, the first medium is provided to the first turbine and the second turbine in series.

15. The environmental control system of claim 13, wherein the at least one compressing device includes a first compressor and a second compressor, and in a first mode of the plurality of modes, the first medium is provided to at least one of the first compressor and the second compressor, and in a second mode of the plurality of modes, the first medium is provided to the first compressor and the second compressor in series.

* * * * *